United States Patent
Knudsen et al.

(10) Patent No.: US 6,179,891 B1
(45) Date of Patent: Jan. 30, 2001

(54) FILTER ARRANGEMENT AND A METHOD FOR ITS MANUFACTURE

(75) Inventors: Jörgen Knudsen, Angelbachtel; Wolfgang Schmidt, Laudenbach, both of (DE)

(73) Assignee: Firma Carl Freudenberg, Weinheim (DE)

(*) Notice: Under 35 U.S.C. 154(b), the term of this patent shall be extended for 0 days.

(21) Appl. No.: 09/130,035

(22) Filed: Aug. 4, 1998

(30) Foreign Application Priority Data

Aug. 21, 1997 (DE) ................................ 197 36 290

(51) Int. Cl.⁷ .................................................. B01D 29/07
(52) U.S. Cl. ................. 55/502; 55/497; 55/500; 55/511; 55/521
(58) Field of Search ............... 55/497, 500, 502, 55/511, 521, 524

(56) References Cited

U.S. PATENT DOCUMENTS

| | | | |
|---|---|---|---|
| 4,617,122 | * 10/1986 | Kruse et al. | 55/497 |
| 5,071,555 | * 12/1991 | Enbom | 55/500 |
| 5,501,794 | * 3/1996 | Van de Graaf et al. | 55/497 |
| 5,512,075 | * 4/1996 | Ninomiya et al. | 55/497 |
| 5,531,892 | * 7/1996 | Duffy | 55/497 |
| 5,603,747 | * 2/1997 | Matuda et al. | 55/497 |
| 5,620,505 | * 4/1997 | Koch et al. | 55/497 |
| 5,792,229 | * 8/1998 | Sassa et al. | 55/497 |
| 5,795,361 | * 8/1998 | Lanier, Jr. et al. | 55/502 |
| 6,045,598 | * 4/2000 | Fath et al. | 55/502 |
| 6,045,600 | * 4/2000 | Michaelis et al. | 55/502 |

* cited by examiner

Primary Examiner—David A. Simmons
Assistant Examiner—Minh-Chau T. Pham
(74) Attorney, Agent, or Firm—Kenyon & Kenyon

(57) ABSTRACT

A filter arrangement made up of an accordion fold pack which is sealingly arranged in a housing. The housing is deep drawn in one piece from a polymeric material sheet. A limit stop is punched out of the base of the housing. A seal surrounds the accordion fold pack and seals against the housing.

13 Claims, 4 Drawing Sheets

FILTER ARRANGEMENT AND A METHOD
FOR ITS MANUFACTURE

BACKGROUND OF THE INVENTION

1. Field of the Invention

The present invention relates to a filter arrangement and a method for its manufacture.

2. Description of the Related Art

Filter arrangements are known in the art, wherein the housing is made up of separately manufactured side plates, which are assembled and then glued to create a tight-fitting bond.

Filter housings of this type are unsatisfactory from the standpoint of production engineering and of economy.

SUMMARY OF THE INVENTION

The present invention is based on the object of providing a filter arrangement which can be manufactured quickly, simply, and cost effectively.

To achieve the object of the present invention, the filter housing in manufactured of one deep-drawn molded piece. The housing is preferably made of a polymeric material. Manufacturing a housing from a polymeric material can be carried out particularly simply and cost-effectively, compared to a housing made of four side plates which are assembled and then glued to each other in order to produce a tight-fitting bond.

A housing made of a polymeric material can, for example, also be used in areas of high humidity without the material of the housing rusting or becoming soft, as in prior art housings.

The filter arrangement of the present invention can surround an accordion fold pack with a housing. The accordion fold pack, on the peripheral side, is entirely encircled by a seal at least once along its entire height. The accordion fold pack, which may be elastically prestressed, is arranged in the housing, sealingly but non-adhesively. In this way, the filter unit is capable of pre-assembly, is made up of the accordion fold pack surrounded by the seal, and can be installed into the housing significantly more quickly. The filter arrangement of the present invention can be manufactured simply and cost-effectively.

According to an advantageous embodiment of the present invention, provision can be made that, for the accordion fold pack, the housing has at least one limit stop projecting to the inside of the housing on the outlet side of the housing. In this way, installing the accordion fold pack surrounded by the seal into the housing is further simplified, and assembly defects are minimized. For installing the filter unit, which can be pre-assembled and is made up of the accordion fold pack and the seal, into the housing, the filter unit is inserted from the inlet side until the outlet-side edge of the filter unit contacts the adjacent limit stop of the housing. The accordion fold pack and the housing are then optimally positioned with respect to each other.

The seal is preferably made of a nonwoven fabric, and the accordion fold pack of a glass fiber paper. Depending on the particular circumstances of the application in which the filter is being used, the seal and the accordion fold pack can be made of the same nonwoven fabric. In this regard, it is advantageous if the seal and the accordion fold pack, after their use, can be disposed of and/or reused together.

The accordion fold pack and the seal are preferably adhesively joined, for example, by being glued to each other.

On the other hand, however, the possibility exists that the seal is designed to be ring-shaped, closed upon itself, and encircling the accordion fold pack, in a pre-stressed, sealing and non-adhesive manner.

The specific embodiment described above is nevertheless the preferred one, because positioning an accordion fold pack and seal relative to each other during installation in the housing is thus avoided, so that assembly is made easier.

One advantage of the filter arrangement of the present invention is that the accordion fold pack, as a result of the non-adhesive fastening, can be removed from the housing without difficulty, so that, after use, it be able to be replaced by a new accordion fold pack, which is surrounded by a seal. The housing can thus be reused as often as desired.

The filter arrangement of the present invention is manufactured such that a plate made of a polymeric material is deep-drawn to produce a housing having essentially a pot-shaped or cup-shaped cross section, and then the base, with the exception of the limit stop, is punched out, the exterior periphery of the accordion fold pack being completely encircled by the seal at least once, and the encircled accordion fold pack being pressed into the housing down to the limit stop.

The accordion fold pack and the seal are preferably glued to each other. In this way, it is ensured that the unit, which can be pre-assembled and is made up of the accordion fold pack and the seal, can be installed easily.

BRIEF DESCRIPTION OF THE DRAWINGS

The filter arrangement as well as the method for manufacturing it are further described below on the basis of the drawings. The drawings show, in each case, a schematic representation in which.

DETAILED DESCRIPTION OF THE INVENTION

Figure 1:
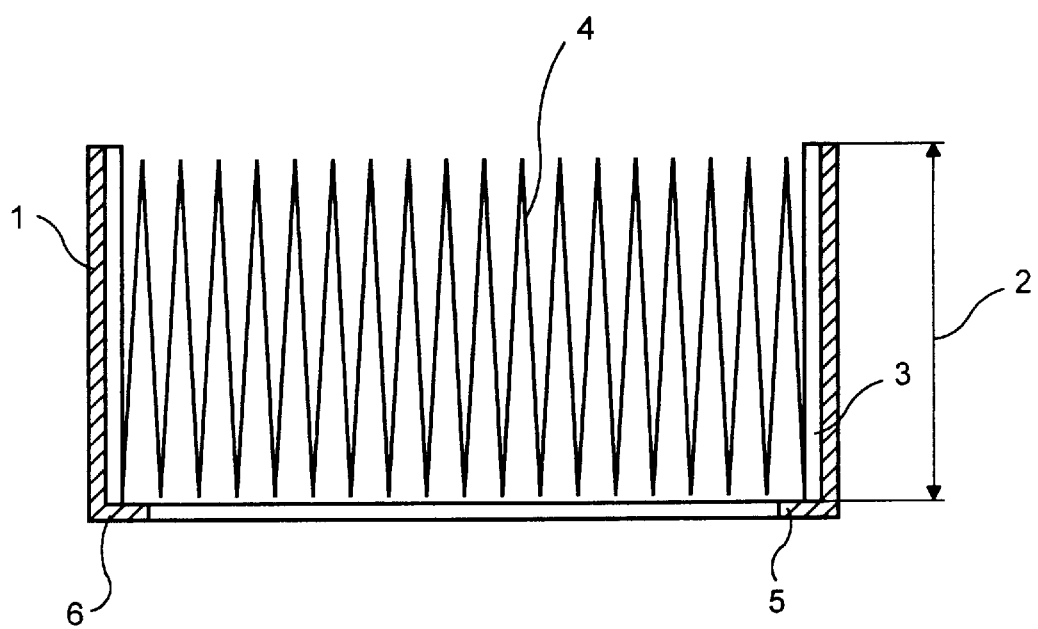
FIG. 1 is a cross section of an exemplary embodiment of a filter arrangement according to the present invention.
Figure 2:
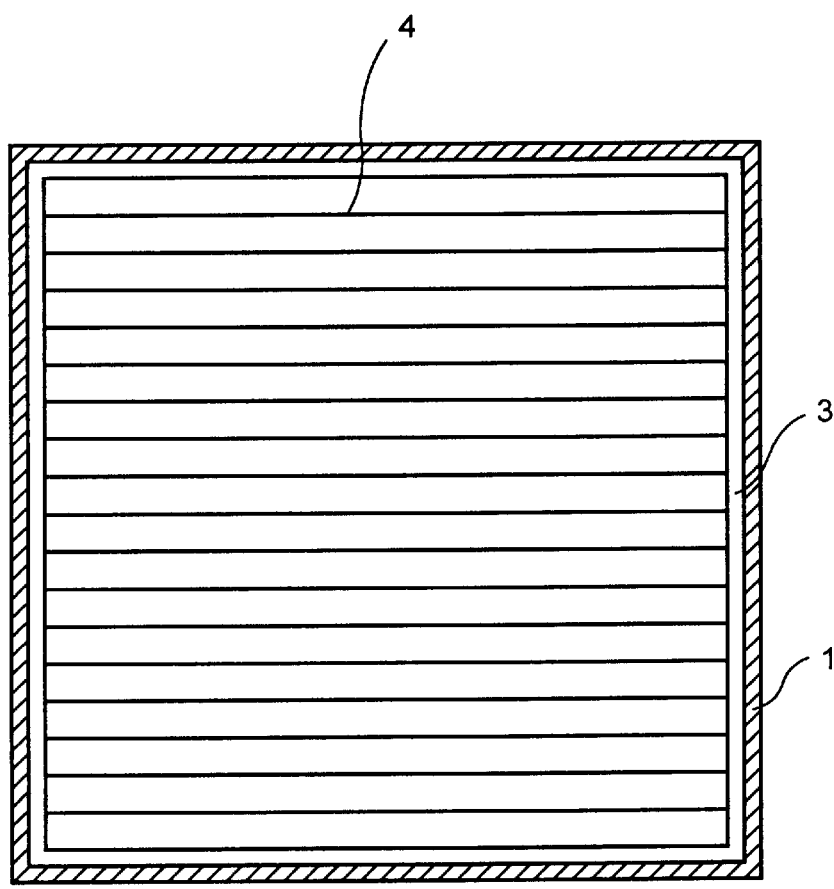
FIG. 2 is a top view of the filter arrangement according to FIG. 1.
Figure 3:
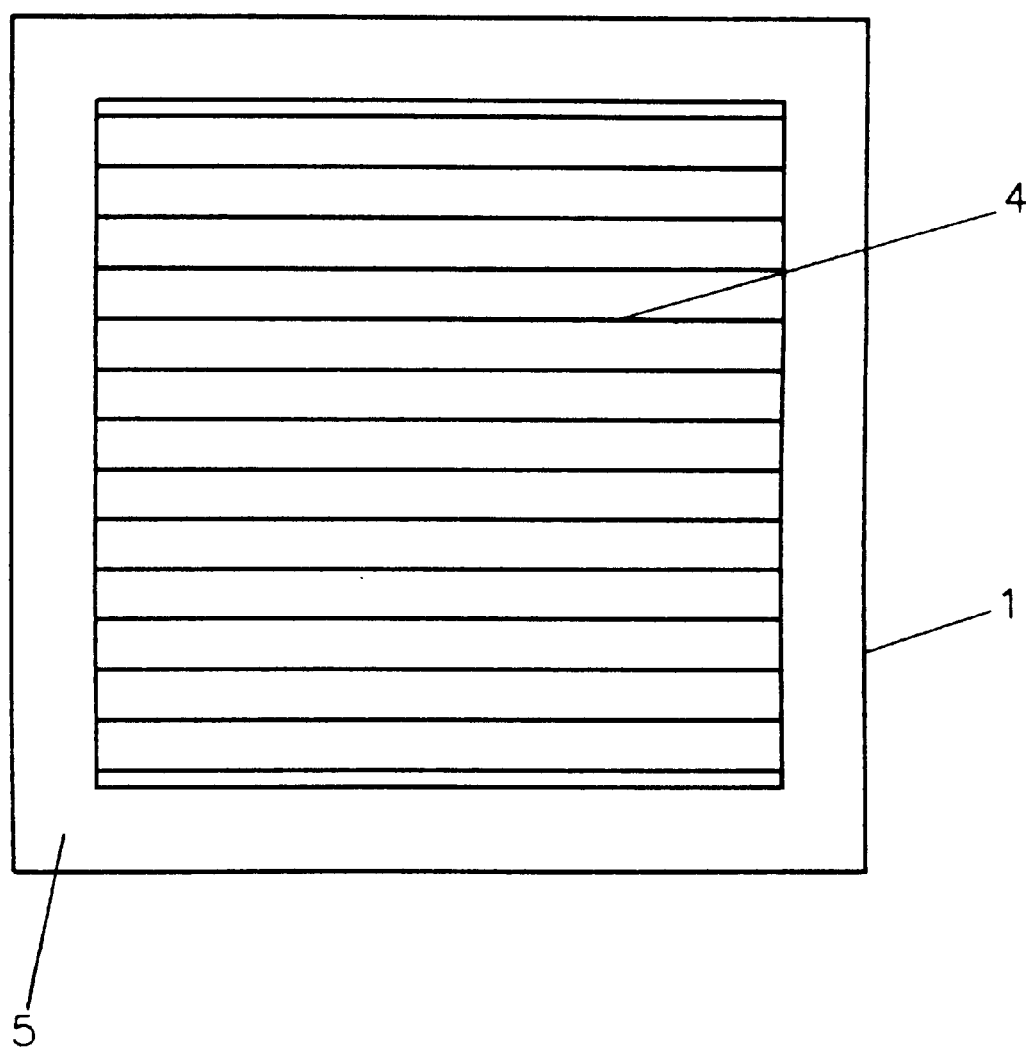
FIG. 3 is a view from below of the filter arrangement according to FIG. 1.

In FIGS. 1 to 3, an exemplary embodiment of a filter arrangement according to the present invention is depicted. The filter arrangement contains a filter unit, which can be pre-assembled and is made up of an accordion fold pack 4 surrounded by a seal 3 on the peripheral side along its entire height. This filter unit, which may be preassembled, has in its uninserted condition with regard to the insertion space in housing 1, an overdimension—i.e., is larger than the space into which it is to be inserted. As a result, accordion fold pack 4 is therefore arranged in an elastically pre-stressed manner in housing 1, sealingly (as a result of seal 3) but non-adhesively. Sealing created by seal 3 between accordion fold pack 4 and housing 1 comes about exclusively as a result of an elastic pressure compaction of seal 3.

In the exemplary embodiment of FIG. 1, accordion fold pack 4 is made of a glass fiber paper and seal 3 of a nonwoven fabric. Accordion fold pack 4 and seal 3 are preferably glued to each other.

From FIG. 1 it can be seen that housing 1 has an essentially pot-shaped or cup-shaped cross section. Housing 1 is made of a deep-drawn polymeric material. The base 6 of housing 1 is formed only of a limit stop 5, which, in housing 1, protrudes toward the inside of housing 1 at the outlet side of the filter unit. The remainder of base 6, on the inner side of limit stop 5, is punched out of the polymeric material. A goal in manufacturing housing 1 is that limit stops 5 have the smallest possible dimensions in the direction of accordion fold pack 4, in order not to restrict the outlet cross section more than necessary and impede flow through the filter unit.

Accordion fold pack 4 is surrounded on its peripheral side along its entire height 2 by the seal 3, in order to prevent a short circuit or side diversion of the flow through the accordion fold pack 4, between the inlet and outlet sides of accordion fold pack 4.

FIG. 2 shows a top view of the inlet side of the accordion fold pack 4. It can be seen that seal 3, made of nonwoven fabric, entirely surrounds accordion fold pack 4 on the peripheral side and is elastically pre-stressed and sealingly contacts the inner side of housing 1, facing accordion fold pack 4, on all sides.

FIG. 3 shows a view from below of accordion fold pack 4 according to FIG. 1. It can be seen that limit stop 5 is designed in the shape of an aperture and extends along the entire periphery of housing 1. Limit stop 5 extends in the direction toward the inside, the dimension of limit stop 5 being larger than the thickness of seal 3. In this way, it is assured that not only seal 3 but also at least one fold of accordion fold pack 4 contacts limit stop 5. Thus an exact positioning of accordion fold pack 4 with regard to housing 1 is ensured.

Figure 4:
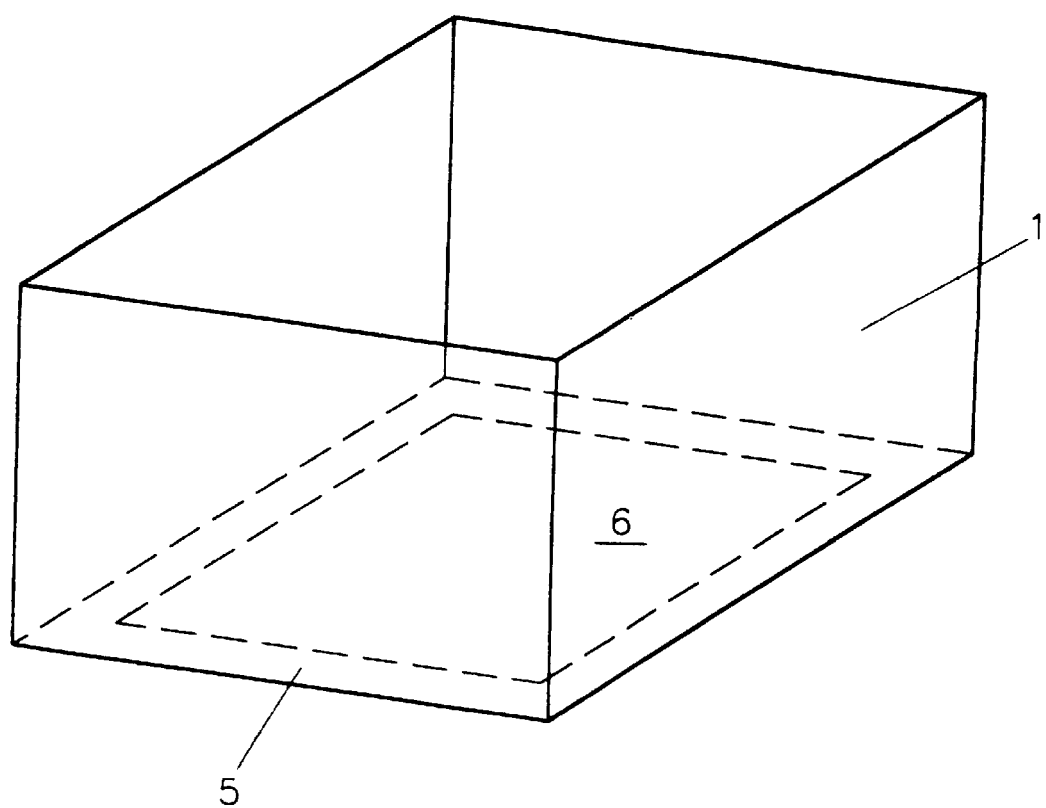
FIG. 4 is a perspective representation of the housing.

FIG. 4 depicts housing 1 in perspective. Housing 1 is manufactured from a sheet of polymeric material which is deep-drawn, and it is therefore designed in one piece. When the deep-drawing process is completed, base 6 inside limit stop 5 is punched out.

The present invention contemplates a number of different variations on the above-described preferred embodiment. It is to be understood that the above description is only of one preferred embodiment, and the scope of the invention is to be measured by the claims below.

What is claimed is:

1. A filter arrangement, comprising:

an accordion fold pack;

a seal directly in contact with and surrounding the entire height of the exterior side perimeter of the accordion fold pack; and a housing, the accordion fold pack being arranged and sealed against the housing with the seal, the housing is deep drawn in one piece.

2. The filter arrangement of claim 1, wherein:

the housing is made of a polymeric material.

3. The filter arrangement of claim 1 wherein the seal contacts the housing with elastic pre-stress in a sealing but non-adhesive manner.

4. The filter arrangement of claim 1, wherein:

the housing includes a limit stop at an outlet end of the housing, the limit stop protruding towards an inside of the housing.

5. The filter arrangement of claim 1, wherein:

the seal is made of a nonwoven fabric.

6. The filter arrangement of claim 1, wherein:

the accordion fold pack is made of a nonwoven fabric.

7. The filter arrangement of claim 1, wherein:

the accordion fold pack and the seal are adhesively joined.

8. A method for manufacturing a filter arrangement comprising:

deep-drawing a sheet of polymeric to produce a housing having essentially a pot-shaped cross section;

punching out a portion of a base of the housing to create a limit stop;

surrounding the entire height of the exterior side perimeter of an accordion fold pack with a seal directly in contact with the entire height of the exterior side perimeter of the accordion fold pack; and inserting the accordion fold pack into the housing down to the limit stop.

9. The method of claim 8, further comprising:

adhesively joining the accordion fold pack and the seal.

10. A method for replacing a filter arrangement in a housing having a limit stop comprising:

removing from the housing a first accordion fold pack having an exterior seal placed outside of and in direct contact with the entire height of the exterior side periphery of the first accordion fold pack; and, inserting into the housing a second accordion fold pack having an exterior seal placed outside of and in direct contact with the entire height of the exterior side periphery of the second accordion fold pack.

11. The method of claim 10 wherein the exterior seal placed around the exterior periphery of the second accordion fold pack is adhesively joined to the exterior periphery of the second accordion fold pack.

12. The method of claim 10 wherein the exterior seal placed around the exterior periphery of the second accordion fold pack is made from a nonwoven fabric.

13. The method of claim 10 wherein the exterior seal placed around the exterior periphery of the second accordion fold pack contacts the housing with elastic pre-stress in a sealing but non-adhesive manner.

* * * * *